United States Patent Office 3,365,490
Patented Jan. 23, 1968

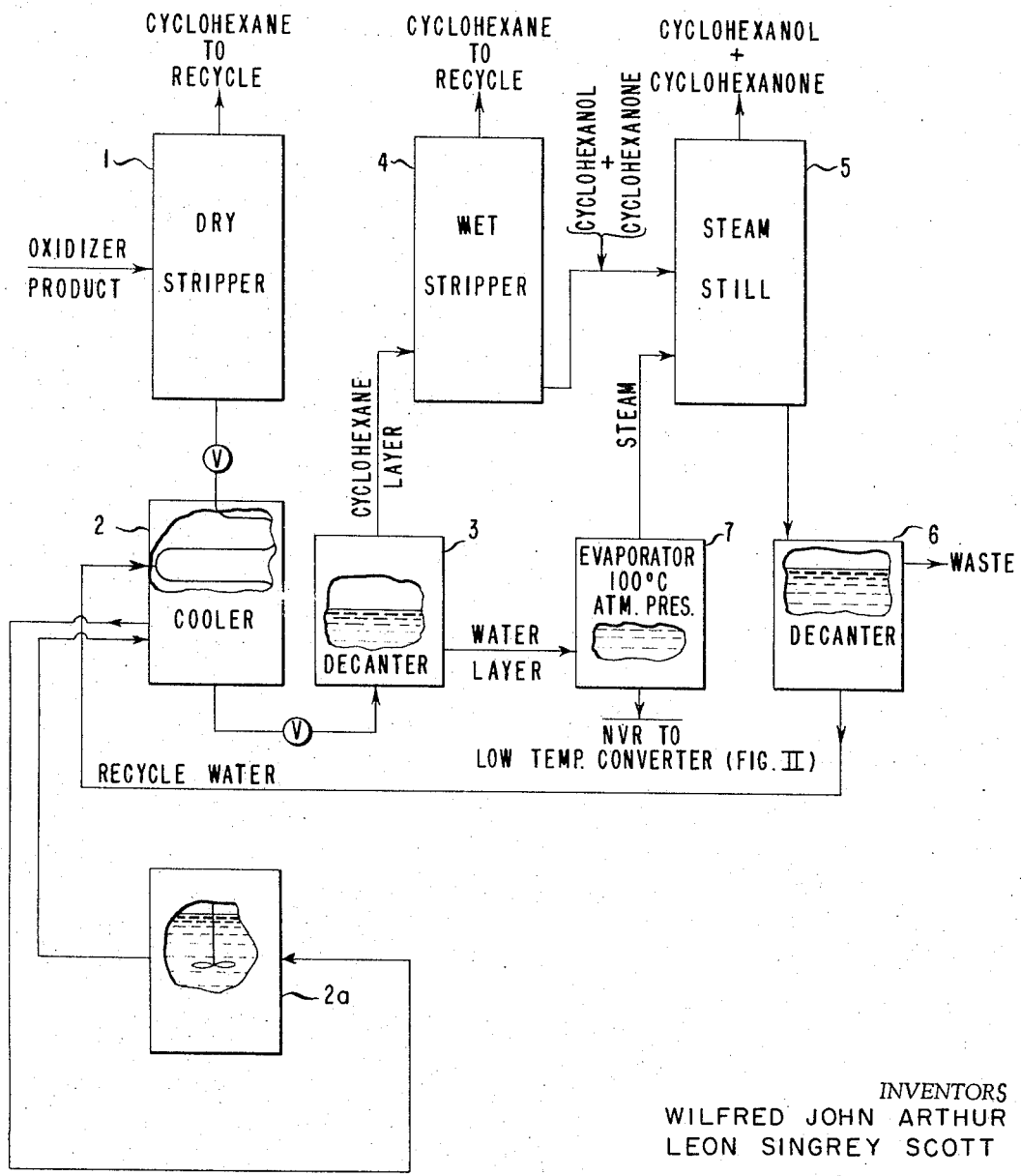

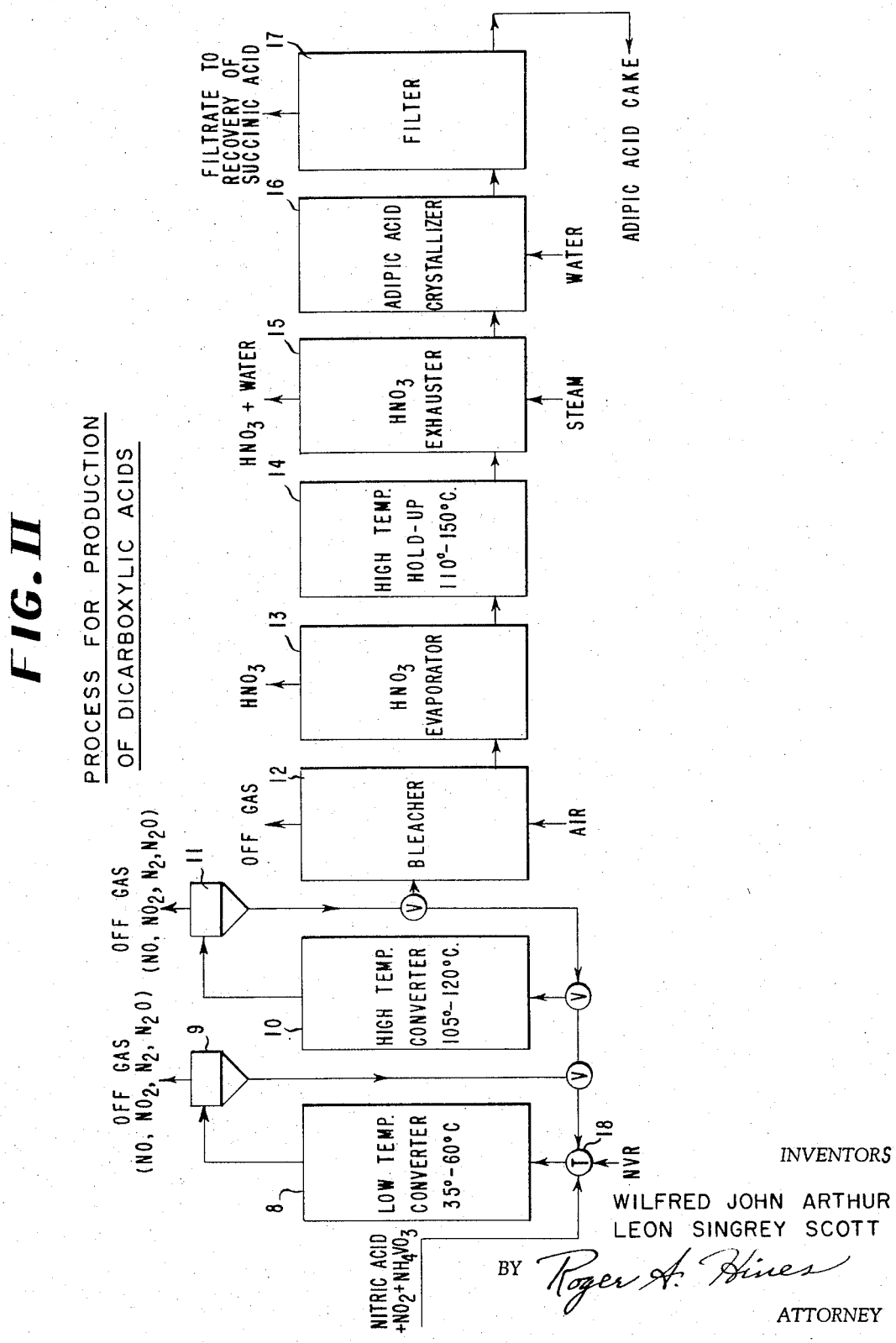

3,365,490
PROCESS FOR THE PRODUCTION OF DICARBOXYLIC ACIDS
Wilfred John Arthur, Charleston, W. Va., and Leon Singrey Scott, Orange, Tex., assignors to E. I. du Pont de Nemours and Company, Wilmington, Del., a corporation of Delaware
Continuation of application Ser. No. 193,193, May 8, 1962. This application Aug. 5, 1966, Ser. No. 571,158
1 Claim. (Cl. 260—531)

ABSTRACT OF THE DISCLOSURE

This invention relates to an improvement in the process for preparing adipic acid by first subjecting cyclohexane to oxidation with air and subsequently separating the cyclohexanone and cyclohexanol formed from the by-products and oxidizing this mixture of cyclohexanol and cyclohexanone with aqueous $HNO_3$ to produce adipic acid. The improvement is achieved by concentrating the effluent from the air-oxidizer to 60–80% cyclohexane, extracting a useful portion of the non-volatile by-products from the organic phase with water, concentrating the aqueous extract and employing the resultant steam to steam-distill the cyclohexanol and cyclohexanone away from the non-useful portion of the non-volatile residue remaining in the organic phase and oxidizing the residue from the aqueous extract to adipic acid with aqueous $HNO_3$ at a low temperature (35–50° C.) in the presence of added $NO_2$.

---

This application is a continuation of application Ser. No. 193,193 filed May 8, 1962, and now abandoned.

This invention is concerned with a process for the preparation of dicarboxylic acids by the oxidation of omega-hydroxycarboxylic acids and other dicarboxylic acid precursors including the esters and lactones of omega-hydroxy acids produced during the air oxidation of cyclohexane to cyclohexanone and cyclohexanol. More particularly, this invention is concerned with a process for the production of adipic, glutaric, and succinic acids by the oxidation of a non-volatile residue from the air oxidation of cyclohexane.

Adipic acid is a valuable intermediate for use in the production of nylon resins and adipic, glutaric, and succinic acids are valuable for use in the production of plasticizers, foodstuffs, and other industrial chemicals. It has long been known that adipic acid can be prepared by processes which involve the air oxidation of cyclohexane to give cyclohexanol and cyclohexanone along with a proportion of by-products, including monocarboxylic acids, various condensation products, and partially oxidized monocarboxylic acids such as the omega-hydroxycarboxylic acids, their esters and lactones and some dicarboxylic acids including adipic, glutaric, and succinic acids. Subsequently the products of the air oxidation of cyclohexane have been subjected to further oxidation with nitric acid according to various processes.

The air oxidation of cyclohexane is described in the Loder Patent, U.S. 2,223,494, issued on Dec. 3, 1940. Processes for the nitric acid oxidation of the whole oxidized product from the oxidation of cyclohexane are described in U.S. Patents 2,557,282 and 2,439,513 issued to Hamblet and McAlevy on June 19, 1951 and Apr. 13, 1948, respectively. These patents provide processes for a two-step nitric acid oxidation of the whole mixture of oxidized products from the air oxidation of cyclohexane.

According to the teaching of the above-mentioned patents, the first step of the nitric acid oxidation is carried out, preferably with 50–60% nitric acid, in the presence of copper and vanadium salts at a temperature preferably in the range of 60–80° C.; and the second stage of the nitric acid oxidation is carried out at a temperature between 90–120° C. Under the foregoing conditions, a mixture of dicarboxylic acids is obtained which contains less than the desired amount of adipic acid relative to glutaric and succinic acids. Additionally and concurrently, the consumption of nitric acid by conversion to non recoverable $N_2O$ and $N_2$ under these conditions is usually as high as 5 pounds for each pound of dicarboxylic acid containing the same number of carbon atoms as the carbon skeleton of the feed stock. The economics of this reaction have proved unsatisfactory due to this large consumption of nitric acid with concurrent formation of relatively large proportions of undesired byproducts which are difficult to remove from the desired adipic acid.

Therefore, preferred commercial processes have usually involved a fractionation of the products from the air oxidation of cyclohexane prior to the nitric acid oxidation step. This fractionation separates out cyclohexanol and cyclohexanone from a non-volatile residue. This residue contains some free adipic acid and esters of adipic acid plus a complex mixture of oxidation products, including other dicarboxylic acids, which under the conditions required for optimum nitric acid oxidation of cyclohexanol and cyclohexanone do not provide an economic source of adipic, glutaric, and succinic acids. One major constituent of the non-volatile residue is epsilon-hydroxycaproic acid, a potential precursor of adipic acid, which is present partially in the form of esters—either the internal ester or lactone, or polymeric esters. Homologous precursors to glutaric and succinic acids are also present. At the present time, in commercial practice, vast quantities of this residue are burned since no economical route for conversion to adipic, glutaric, and succinic acids has been known heretofore. The commercial value of a successful oxidation process to convert this residue into recoverable adipic, glutaric, and succinic acids is obvious.

Therefore, an object of this invention is to provide an economical process for the oxidation of a portion of this residue to adipic, glutaric, and succinic acids, and for recovery in a pure state of the free adipic acid present in the residue. A specific objective is to isolate a non-volatile residue (NVR) free from monobasic acids and colorformers and then to convert this NVR to a mixture of adipic, glutaric, and succinic acids with a low conversion of $HNO_3$ to nonrecoverable $N_2O$ and nitrogen. Still another object of this invention is to convert NVR to adipic acid free from color-forming impurities. Other objects and advantages of this invention will appear hereinafter.

FIGURES I and II provide a diagrammatic flow sheet of a commercial process carried out in accordance with this invention, as more fully explained in Example 7 hereinbelow.

In accordance with the objects of this invention it has been found that the optimum conditions for conversion of this non-volatile residue, hereinafter designated NVR, to a maximum yield of adipic, glutaric, and succinic acids are quite different from the optimum conditions for the nitric acid oxidation of cyclohexanone and cyclohexanol to adipic acid. Thus, it now has been found that adipic, glutaric and succinic acids can be prepared by subjecting NVR to nitric acid oxidation at 35–60° C., employing nitric acid having a concentration of 30–70%. The oxidation can be carried on at atmospheric pressure or at pressures up to 200 p.s.i.g. It has been found that, in the preferred process, the $HNO_3$ should be present at a ratio (weight basis) to the NVR of 3 to 1 to 20 to 1; however, when oxygen is added with the nitric acid, a 1 to 1 ratio can be employed.

Furthermore, in accordance with this invention, it has been found that at this lower temperature, nitric acid oxidation of NVR does not commence in a reproducible fashion and is not therefore readily controlled in a continuous process unless $NO_2$ is added to the aqueous nitric acid prior to contacting the nitric acid solution with the NVR. Thus, although the reaction can be carried out with nitric acid alone, at least 1 lb., and preferably about 2 lbs. of $NO_2$ is required per 1000 lbs. of aqueous $HNO_3$ to eliminate an uncertain induction period and hence to reduce the holdup time required for this step in the nitric acid oxidation of NVR, and to give a uniform, rapid, but controlled, reaction. It has further been found that for the nitric acid oxidation of NVR, copper catalyst is not required, but the presence of ammonium vanadate (or other vanadate salts) is necessary as a catalyst. Vanadium can be present at a concentration between about 10 and 1000 p.p.m. calculated as ammonium vanadate, in the nitric acid feed mix. According to the process of this invention, after holding the oxidation at 35–60° C. for from 5 to 60 minutes, it is desirable to finish off the oxidation by raising the temperature to from 105 to 120° C. for from 10 to 60 minutes. During this period, a large proportion of color-forming by-products are destroyed. The NO formed in the two oxidation stages is converted to $NO_2$ by contact with oxygen and recycled.

As an additional part of this invention, it has been discovered that a further improvement in the quality of the adipic, glutaric, and succinic acid mixture is obtained by evaporating the mixture to remove most of the water and part of the nitric acid to leave a molten mixture of the dicarboxylic acids containing 5–15% $HNO_3$ by weight as highly concentrated $HNO_3$. After holding this mixture at 110 to 150° C. for from 10 to 60 minutes, the dicarboxylic acid mixture is substantially free of color-forming impurities.

In accordance with the process of this invention, the amount of adipic acid produced can be increased relative to the amount of glutaric and succinic acids, by carrying out the first nitric acid oxidation step at about 35° C. At about 60° C., the amount of adipic acid produced is decreased relative to glutaric and succinic acids. Thus, it has been found that changes in temperature are a means for controlling the relative amounts of adipic, glutaric, and succinic acids produced from NVR.

Another critical aspect of this invention has been found to involve the isolation of NVR in a suitable condition for maximum conversion to pure dicarboxylic acids by extracting it, with water, from the effluent from the cyclohexane oxidizer. The extraction must be carried out at some point in the system before all of the excess, unreacted cyclohexane is removed, since it has been discovered that the cyclohexane acts selectively to dissolve undesirable monocarboxylic (e.g. caproic and valeric) acids and color-forming impurities which otherwise would contaminate the adipic, succinic, and glutaric acids, while the water selectively absorbs free adipic acid and precursors to adipic, succinic, and glutaric acids such as the hydroxycarboxylic acids. In practice it has been found that the water extraction must be carried out in the presence of at least 30% (but up to 95% may be present) unreacted cyclohexane (based on total organics present) in order to absorb a minimum amount of undesirable contaminants into the water layer. The cyclohexanone and cyclohexanol produced in the cyclohexane oxidizer are selectively absorbed into the cyclohexane-rich stream and subsequently purified prior to nitric acid oxidation according to the processes of the prior art.

The amount of water used for extracting the NVR containing dicarboxylic acids and dicarboxylic acid-precursors, as hereinabove defined, may be varied from 0.1 to 5.0 pounds per pound of organic phase, depending upon the amount of unreacted cyclohexane present.

This aqueous extract is then concentrated by evaporation of the water, conveniently at about atmospheric pressure and about 100° C., until a concentration of 50 to 90% organics, consisting essentially of adipic acid and epsilon-hydroxycaproic acid (or its esters and lactone) together with precursors to the homologous glutaric and succinic acids, is achieved.

According to the process of this invention, the use of relatively large amounts of water (e.g. 0.2–1.0 pounds per pound of organic phase) for extraction is made economical by using the vapors produced during concentration of the aqueous extract as steam to produce boilup in a steam distillation column used for purifying cyclohexanone and cyclohexanol after separation from the unreacted cyclohexane, as described hereinabove. Then the water layer from the base of this cyclohexanol-cyclohexanone distillation column is used for the extraction of NVR as described above. This water layer as it comes from the distillation column also contains some precursors to dicarboxylic acids as a result of hydrolysis of esters in the distillation column. Thus the steam distillation column acts as a second extraction step which increases the yield of dicarboxylic acids eventually achieved. Furthermore, by using water from the steam distillation column for the extraction of NVR and then using the vapor from the evaporation of the aqueous extract as boilup in this same steam-distillation column, no appreciable net increase in steam or water requirements results from the water extraction, and high extraction efficiency is attainable.

The concentrated aqueous extract containing NVR is then subjected to nitric acid oxidation under the conditions of the process of this invention. In this way, adipic, glutaric, and succinic acids are obtained relatively free from contamination with monocarboxylic acids or with compounds which are color formers, and very little nitric acid is lost by conversion to $N_2O$ or $N_2$. The NO formed is converted to $NO_2$ with oxygen (or air) and recirculated.

Various types of reactors have been employed for carrying out the nitric acid oxidation process of this invention. Such reactors include jacketed, stirred pots and autoclaves, and shell and tube heat exchangers fed with recycle pumps. The particular type of apparatus is not critical provided that it produces thorough and rapid mixing of the oxidant, comprising aqueous nitric acid and $NO_2$ and $NH_4VO_3$, with the NVR. It is also necessary that an adequate heat exchange surface be provided to control the temperature of the reaction.

One particularly desirable continuous reactor consists of a shell and tube heat exchanger into which a mixture of nitric acid feed mix, $NO_2$, and NVR is introduced on the tube side and warm water, for cooling the reaction, is passed through on the shell side. The reaction mixture leaving the exit end of the heat exchanger is passed to a cyclone separator where nitrogen oxides, largely NO, are separated from the reaction mixture, oxidized with $O_2$ (or air) to $HNO_3$, and recirculated. The liquid phase is then recirculated back to the heat exchanger except for a small portion which is passed to another identical heat exchange converter operated at 105–120° C. To the recirculated reaction mixture there is added additional aqueous nitric acid feed mix and then additional NVR, just prior to re-entering the heat exchanger portion of the low temperature converter.

In the high temperature converter no additional nitric feed mix, $NO_2$ or NVR is added to the reaction mixture coming from the low temperature converter. The effluent from the high temperature converter heat exchanger is also passed to a cyclone separator and most of the liquid phase recirculated to the high temperature reactor heat exchanger with a portion of the reaction mixture piped out of the oxidation zone for further processing to recover the adipic, glutaric, and succinic acids.

The product consisting essentially of dicarboxylic acids is evaporated to remove most of the water and nitric acid, thereby obtaining a molten mixture of dibasic acids at about 140° C. which contains about 5–15% by weight of concentrated nitric acid. When this molten mixture is held up for from 10 to 60 minutes, virtually all of the color-forming impurities are destroyed and the dicarboxylic acids, when separated and recovered, are of exceptionally high purity. The nitric acid and water which are evaporated from the dicarboxylic acid mixture are recycled to the oxidation step.

By operation of the process of the subject invention there is achieved a much higher yield of adipic acid from NVR than had previously been achieved or thought possible, and a high yield of valuable glutaric and succinic acids can also be achieved. A further unexpected advantage is that the adipic, glutaric, and succinic acids produced are freer from contaminating impurities than had previously been thought possible using the non-volatile residues.

At the lower temperatures at which the process of this invention is operated, there is less conversion to dicarboxylic acids containing fewer carbon atoms than the original chain, a significant improvement in the quality of the adipic acid, glutaric and succinic acids is obtained, and a greatly reduced consumption of nitric acid is required.

While the composition of the non-volatile residue may vary somewhat, the typical average composition is 65% hydroxy acids, of which more than half consists of epsilon-hydroxycaproic acid, 25% dicarboxylic acids, including adipic acid, 5% monocarboxylic acids, and 5% miscellaneous oxidized compounds including cyclohexanol. In general, these compounds are not present in their simplest state in the residue but are present as lactones, salts, and esters.

Under prior art conditions, the nitric acid oxidation of the whole non-volatile residue, from air-oxidation of cyclohexane, to obtain adipic, glutaric, and succinic acids, has not been practical because of the high consumption of oxidant per unit of desired product; and the complexity of the final dicarboxylic acid mixture prevented recovery of pure adipic, glutaric, or succinic acids. However, by use of the process of this invention and specifically, by isolation of NVR by aqueous extraction of the effluent from air oxidation of cyclohexane, and by the use of temperatures in the range of 35–60° C. for the first stage of the nitric acid oxidation of the NVR, and by the concurrent addition of nitrogen dioxide with the nitric acid, it is possible to produce adipic, glutaric, and succinic acids with low expenditure of nitric acid and with a minimum of degradation of the carbon skeleton.

The following specific examples are intended to be illustrative but are not intended to be a limitation upon the invention which is described hereinabove:

*Example 1*

As an example of the prior art oxidation conditions, a nitric acid oxidation process was applied to an organic feed stream comprising NVR; nitric acid oxidation with 50% aqueous nitric acid (containing copper and vanadate catalyst at 500 p.p.m.) at 75° C. produced 0.40 pounds of adipic acid and 0.40 pounds of glutaric and succinic acid per pound of the anhydrous NVR feed while requiring 1.17 pounds of nitric acid to effect the oxidation.

*Example 2*

In contrast to Example 1, oxidation of this same NVR feed stock with the same nitric acid solution in Example 1 under conditions of the process of this invention at 50° C. and with concurrent sparge with gaseous nitrogen dioxide, produced 0.51 pounds of adipic acid and 0.37 pounds of glutaric and succinic acids per pound of anhydrous feed while requiring only 0.62 pounds of $HNO_3$, whether derived from $HNO_3$ or $NO_2$.

*Example 3*

Into a small, all glass, stirred vessel containing 20 ml. of 50% aqueous nitric acid (containing 0.3% Cu, and 0.1% V calculated as ammonium vanadate) at 35° C. was added 3.802 g. of NVR containing 20% water, over a period of 4–5 minutes. By means of external cooling, the temperature was held between 35 and 40° C. for about 5 minutes, and then raised to 105° C. for 15 minutes. The reaction mixture contained 1.525 g. adipic acid, 0.670 g. of glutaric acid and 0.366 g. of succinic acid. The consumption of nitric acid was 1.11 g. of $HNO_3$ as oxidant.

*Example 4*

Into a small, all glass, stirred reactor containing 10 ml. of 50% aqueous nitric acid (having 0.1% Cu, 0.3% V) at 50° C., there was added during a 10-minute period 3.526 g. of NVR which contained 13.6% water. By means of external cooling the temperature was maintained at 50° C. for 30 minutes, after which the reaction was completed by holding a 107° C. for 15 minutes. The reaction mixture contained 1.525 g. of adipic acid, 0.942 g. of glutaric acid, and 0.470 g. of succinic acid. The oxidation consumed 1.04 g. of $HNO_3$.

*Example 5*

Into a small, all glass stirred vessel containing 10 ml. of 55% aqueous nitric acid (containing 0.1% Cu, 0.3% V) at 50° C., was injected over a 4–5 minute period 4.794 g. of NVR containing 13.6% water. Concurrently, and during the subsequent 10 minutes holdup at 50° C., a fine stream of gaseous $NO_3$ was sprayed onto the surface of the stirred mixture, sufficient to provide a slight color of the nitrogen dioxide in the space over the reaction mixture. After a 10-minute period at approximately 107° C., the reaction mixture contained 1.948 g. of adipic acid, 1.102 g. of glutaric acid, and 0.555 g. of succinic acid. The oxidant required was 1.242 g. of $HNO_3$.

*Example 6*

For this example, a continuous reactor system was employed. For the first, or lower temperature nitric acid oxidation portion of the reaction, a once-through tubular reactor was employed which fed a high temperature reactor which was a stirred vessel and from which the product mixture continuously overflowed. For this experiment, the water soluble portion of the NVR was extracted with water from the cyclohexane oxidation product mixture obtained by air-oxidation of cyclohexane according to the process of Loder, U.S. 2,223,494. The aqueous extract was concentrated to about 85% organics content. This aqueous extract of NVR was mixed with 53% aqueous nitric acid to which 0.3 pounds of $NO_2$ per pound of the extracted NVR, on an anhydrous basis, had just been added. In this run the ratio of nitric acid feed mix to NVR solution was about 5.3:1, but it was found subsequently that similar results were achieved when the ratio was only 1:1 when oxygen was added to the low temperature reactor to regenerate $NO_2$ from NO continuously in situ. The $NO_2$ was obtained by recycle of the gases exit the high temperature reactor, with the addition of oxygen to convert NO to $NO_2$. The mixture of aqueous nitric acid, $NO_2$, and extracted NVR was passed through the low temperature reactor at 50–60° C. at a rate which gave 3–15 minutes average contact time. The reactor was maintained at a pressure of 200 p.s.i.g. The nitric acid contained as catalyst 500 p.p.m. by weight vanadate calculated as ammonium vanadate ($NH_4VO_3$).

From the low temperature reactor the reaction mixture was passed through a cyclone separator to remove nitrogen oxides and thence to the high temperature converter where a holdup time of about 45 minutes was allowed at 115° C. to destroy most of the color-forming impurities and complete the oxidation of the extracted NVR.

From the high temperature reactor the nitric acid solution containing adipic acid was passed through an evaporator and the water and a portion of the nitric acid removed by evaporation. The resultant molten mixture of adipic, glutaric, and succinic acids, after being held up for approximately 30 minutes at 140° C. to complete the destruction of color-formers, was further processed by standard recrystallization from water, to separate the adipic acid from the glutaric and succinic acids. Solid, crystalline adipic acid was obtained as the precipitate. The yield of adipic acid was about 0.48 pounds per pound of extracted NVR on an anhydrous basis. Analysis of the filtrate showed that the yield of glutaric acid was about 0.27 pounds per pound of extracted NVR (anhydrous basis) and the yield of succinic acid was about 0.21 pounds per pound of extracted NVR (anhydrous basis).

*Example 7*

This example provides an illustration of a commercial use of the process of this invention in conjunction with a commercial process for the preparation of adipic acid by air oxidation of cyclohexane followed by separation of a mixture of cyclohexanol and cyclohexanone from the oxidation product and subsequent nitric acid oxidation of this mixture of cyclohexanone and cyclohexanol.

FIGURE I shows a diagram of the portion of the process in which the whole product from the air-oxidation of cyclohexane is separated into (A) cyclohexanol plus cyclohexanone for conventional nitric acid oxidation to adipic acid, (B) cyclohexane for recycle to the air-oxidizer, and (C) a non-volatile residue (NVR) consisting essentially of omega-hydroxycarboxylic acids, their esters and lactones together with adipic, glutaric, and succinic acids.

The oxidizer product is passed into a dry stripper 1 where a portion of the unconverted cyclohexane is distilled off overhead until the remaining mixture is concentrated to not less than 30% by weight cyclohexane, and preferably 60–80%. This concentrated solution of oxidized products is then passed through a cooler-mixer 2, 2a where water from decanter 6 is injected into the stream which then passes to an agitated mixer 2a, then recycled to cooler 2 and then is passed to decanter 3. In this decanter the hydrocarbon and aqueous phases separate. With at least 30% cyclohexane (based on total organics) the hydrocarbon phase retains the cyclohexanol (and its esters) and cyclohexanone as well as monobasic acids and a small proportion of very high molecular weight color-formers (polymeric condensation products). The aqueous phase retains the non-volatile residue (NVR) suitable for the subsequent nitric acid oxidation step of this invention. This NVR contains some dicarboxylic acids (adipic acid, glutaric acid, and succinic acid) but consists primarily of omega-hydroxy carboxylic acids, esters and lactones having 4 to 6 carbon atoms in the acid chain, principally epsilon-hydroxycaproic acid, its esters and lactone (precursors of adipic acid).

The aqueous layer from decanter 3 is passed to evaporator 7 where the water is removed overhead as steam which is passed to steam still 5. The hydrocarbon layer from decanter 3 is passed to a wet-stripper 4 where the remaining cyclohexane is distilled off overhead for recycle. The concentrated oxygenated residue is passed to steam still 5 where the cyclohexanol and cyclohexanone are steam-distilled overhead for subsequent purification and nitric acid oxidation according to the process of the art. Some esters are hydrolyzed in the steam still to produce dicarboxylic acid precursors which are recovered from the water layer separated in decanter 6 when it is recycled to the cooler mixer 2.

The aqueous residue from steam-still 5 is passed to decanter 6 where a non-soluble, high-boiling waste fraction containing the tars and colorforming bodies, as well as monobasic acids, is separated and drawn off the top as waste which can be burned. The aqueous layer from decanter 6, which contains some dissolved NVR obtained from hydrolysis of esters in steam-still 5, is then recirculated to the cooler-mixer 2, thus providing an economical source of the large quantity of water needed for extraction of the oxidizer product, as well as of additional adipic acid precursors (epsilon-hydroxy caproic acid, cyclohexanol, etc.) for subsequent nitric acid oxidation.

The residue from evaporator 7 is the NVR employed in the nitric acid oxidation step of the process of this invention; it is passed to the low temperature converter 8 shown in FIGURE II.

It should be noted that the process of the prior art did not include use of cooler 2, decanter 3 nor evaporator 7. In this prior art process all of the NVR ended up in the waste stream from decanter 6 where it was so contaminated with very high-boilers and color-formers that it could not economically be converted to dicarboxylic acids of suitable purity for commercial use. It was a waste product which was burned. Thus, the process of this invention makes it possible to recover millions of pounds annually of valuable dicarboxylic acids formerly lost and results in a very large reduction in the manufacturing costs of dicarboxylic acids, particularly adipic acid.

FIGURE II shows diagrammatically the process for conversion of the NVR stream into valuable dicarboxylic acids. The NVR is mixed with from 3 to 20 parts by weight $HNO_3$ as aqueous nitric acid (30–70%) containing from 10 to 1000 p.p.m. vanadium as $NH_4VO_3$ and 5–10 standard cubic feet of $NO_2$ per pound of NVR at a mixing-T 18 and thence passed to a low temperature converter 8 which is operated at from 35°–60° C., usually below 50° C., particularly when adipic acid is desired in maximum yield. A particularly suitable type of converter is a shell and tube heat exchanger arranged for continuous recycle through a cyclone separator 9. A portion of the recycle stream is diverted to the high-temperature converter 10 at a rate such that the average residence time in the low temperature converter is from 5 to 60 minutes. The NO and $NO_2$ evolved are converted to $HNO_3$ and recycled.

Residence time in the high-temperature converter 10, operated at 105° C., can be from 10 to 60 minutes. This serves to destroy the bulk of the color-forming impurities. The high temperature converter is a shell and tube type reactor, similiar to the low temperature converter 8, operated as a continuous recycle through a second cyclone separator 11 where the off-gases are removed, converted to $HNO_3$ and recycled.

A portion of the recycling high temperature stream is taken off through bleacher 12 where it is blown with air to remove nitrogen oxides and thence to an evaporator 13 where most of the water and $HNO_3$ are removed overhead. The liquid product is passed through a vessel 14 maintained at about 110° C. where the hold-up time is about 15 to 45 minutes to destroy color-formers by the action of the concentrated $HNO_3$ remaining with the product. Thereafter the product stream consisting essentially of dicarboxylic acids is passed to an exhauster 15 where it is heated to 140° C. and blown with steam to remove residual $HNO_3$. The product then is passed to a crystallizer 16 where adipic acid is allowed to crystallize from the aqueous solution. The adipic acid is collected on filter 17 while the mother liquor is passed on to further refining by known methods to separate succinic and glutaric acids.

The process of this example produces adipic acid of commercial quality. If desired, in order to assure a completely uniform product, this adipic acid can be reunited with the adipic acid stream from the nitric acid oxidation of cyclohexanol and cyclohexanone and recrystallized from aqueous nitric acid. The overall yield of adipic acid from cyclohexane obtained by this integrated process is from 3% to 10% higher than in the prior commercial process which did not recover the adipic acid from NVR.

1. In a continuous process for the production of adipic acid in which cyclohexane is subjected to air oxidation and the resultant partially oxidized reaction product mixture is separated by distillation into unreacted cyclohexane, which is recycled, and the oxidation products, which are subjected to steam distillation whereby cyclohexanone and cyclohexanol are separated by volatilization overhead from a non-volatile residue, and in which the mixture of cyclohexanol and cyclohexanone is substantially oxidized with aqueous nitric acid to produce adipic acid, said non-volatile residue comprising omega-hydroxyacids containing 4 to 6 carbon atoms and esters and lactones of said omega hydroxyacids, dicarboxylic acids containing 4 to 6 carbon atoms, and color-forming polymeric condensation products, the improvement which comprises:

(A) distilling a part of the cyclohexane from the partially-oxidized reaction product mixture coming from the air-oxidation step to produce a cyclohexane solution of the oxidized products containing from 60% to 80% cyclohexane;

(B) extracting the cyclohexane solution from Step A with from 0.2 to 1 pound of water per pound of organic phase, said water for extraction being obtained from the aqueous phase of the residue from the steam-distillation of cyclohexanol and cyclohexanone and containing some omega-hydroxyacids and lactones extracted during the steam-distillation.

(C) distilling the remainder of the cyclohexane from the top, organic layer separated from the aqueous extract of Step B and subjecting the residue comprising cyclohexanol, cyclohexanone, polymeric condensation products, and monobasic acids to steam-distillation to remove the volatile oxidation products overhead while decanting the color-forming polymeric condensation products from the top of the aqueous phase of the residue from the steam distillation and recycling this aqueous phase to the extraction Step B;

(D) concentrating the aqueous extract from Step B by evaporation, while passing the steam produced to the steam distillation in Step C, to leave a non-volatile residue, substantially free from color-forming polymeric condensation products and monobasic acids, this non-volatile residue consisting essentially of a mixture of omega-hydroxyacids containing from 4 to 6 carbon atoms and the esters and lactones of said omega-hydroxyacids together with adipic acid, succinic acid, and glutaric acid;

(E) oxidizing the non-volatile residue from Step D to dicarboxylic acids by the use of nitric acid in two stages by mixing and maintaining the non-volatile residue at 35° to 50° C. for from 5 to 60 minutes with from 1 to 20 parts by weight aqueous nitric acid containing 30 to 70% by weight $HNO_3$ and 10 to 1000 p.p.m. vanadium, calculated as $NH_4VO_3$, to which at least one pound of $NO_2$ per 1000 pounds of aqueous $HNO_3$ has been added just prior to contact with the non-volatile residue, and then heating the aqueous nitric acid mixture to a temperature in the range of 105 to 120° C. for from 10 to 60 minutes; and (F) recovering adipic acid by evaporating the product mixture of dicarboxylic acids, $HNO_3$ and water, from Step E to remove $HNO_3$ and water, holding the residue containing concentrated $HNO_3$ dissolved in the molten dicarboxylic acids at 110°–150° C. for from 15 to 45 minutes, blowing the molten residue with steam to remove residual $HNO_3$, and dissolving the molten residue in hot water, cooling, and collecting the precipitated adipic acid.

References Cited
UNITED STATES PATENTS

| | | | |
|---|---|---|---|
| 2,557,282 | 6/1951 | Hamblet et al. | 260—531 |
| 2,703,331 | 3/1955 | Goldbeck et al. | 260—531 |
| 2,719,172 | 9/1955 | Nebe et al. | 260—531 |
| 2,844,626 | 7/1958 | Kamlet | 260—531 |

LORRAINE A. WEINBERGER, *Primary Examiner.*

V. GARNER, *Assistant Examiner.*

UNITED STATES PATENT OFFICE
CERTIFICATE OF CORRECTION

Patent No. 3,365,490                                  January 23, 1968

Wilfred John Arthur et al.

It is certified that error appears in the above identified patent and that said Letters Patent are hereby corrected as shown below:

Column 6, line 24, "$NO_3$" should read -- $NO_2$ --. Column 8, line 74, "substantially" should read -- subsequently --. Column 9, line 17, "steam-distillation." should read -- steam-distillat --.

Signed and sealed this 30th day of December 1969.

(SEAL)
Attest:

Edward M. Fletcher, Jr.                          WILLIAM E. SCHUYLER, JR.
Attesting Officer                                      Commissioner of Patents